US008224337B2

(12) United States Patent
Gosnell et al.

(10) Patent No.: US 8,224,337 B2
(45) Date of Patent: Jul. 17, 2012

(54) METHODS, SYSTEMS, AND COMPUTER READABLE MEDIA FOR PROVIDING FOREIGN ROUTING ADDRESS INFORMATION TO A TELECOMMUNICATIONS NETWORK GATEWAY

(75) Inventors: Bradley W Gosnell, Mundelein, IL (US); Michael Coupland, Belfountain (CA); Amrit Pal Singh Wadhwa, Cary, NC (US); Peter Joseph Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 0 days.

(21) Appl. No.: 12/883,886

(22) Filed: Sep. 16, 2010

(65) Prior Publication Data
US 2011/0098049 A1    Apr. 28, 2011

Related U.S. Application Data

(60) Provisional application No. 61/243,014, filed on Sep. 16, 2009.

(51) Int. Cl.
*H04W 40/00* (2009.01)
(52) U.S. Cl. ............... 455/445; 455/433; 455/432.1; 379/221.13; 370/352
(58) Field of Classification Search ............... 455/445, 455/432.1–435.1, 552.1; 379/221.13, 221.14; 370/352–356, 401
See application file for complete search history.

(56) References Cited

U.S. PATENT DOCUMENTS

| 4,310,727 | A | 1/1982 | Lawser |
| 4,754,479 | A | 6/1988 | Bicknell et al. |
| 5,089,954 | A | 2/1992 | Rago |
| 5,237,604 | A | 8/1993 | Ryan |
| 5,247,571 | A | 9/1993 | Kay et al. |
| 5,251,248 | A | 10/1993 | Tokunaga et al. |
| 5,400,390 | A | 3/1995 | Salin |
| 5,422,941 | A | 6/1995 | Hasenauer et al. |
| 5,423,068 | A | 6/1995 | Hecker |
| 5,430,719 | A | 7/1995 | Weisser, Jr. |
| 5,442,683 | A | 8/1995 | Hoogeveen |
| 5,455,855 | A | 10/1995 | Hokari |

(Continued)

FOREIGN PATENT DOCUMENTS

EP    0 512 962 A2    11/1992
(Continued)

OTHER PUBLICATIONS

Official Action for U.S. Appl. No. 12/400,576 (Aug. 24, 2011).
(Continued)

*Primary Examiner* — Sharad Rampuria
(74) *Attorney, Agent, or Firm* — Jenkins, Wilson, Taylor & Hunt, P.A.

(57) ABSTRACT

The subject matter described herein includes methods, systems, and computer readable media for providing foreign routing address information to a telecommunications network gateway. According to one aspect, the method includes, at a call signaling message routing node in a first telecommunications network, intercepting a call setup message that includes a called party number identifier and is directed towards a network gateway connected to at least one foreign telecommunications network. The method also includes accessing a foreign routing information database using an ENUM formatted query message to obtain foreign routing address information associated with the at least one foreign telecommunications network, modifying the call setup message to include the address information, and routing the modified call setup message towards the network gateway.

35 Claims, 6 Drawing Sheets

U.S. PATENT DOCUMENTS

| | | | |
|---|---|---|---|
| 5,457,692 A | 10/1995 | Ishinabe et al. |
| 5,457,736 A | 10/1995 | Cain et al. |
| 5,481,603 A | 1/1996 | Gutierrez et al. |
| 5,502,726 A | 3/1996 | Fischer |
| 5,504,804 A | 4/1996 | Widmark et al. |
| 5,526,400 A | 6/1996 | Nguyen |
| 5,546,398 A | 8/1996 | Tucker et al. |
| 5,550,914 A | 8/1996 | Clarke et al. |
| 5,572,579 A | 11/1996 | Orriss et al. |
| 5,579,372 A | 11/1996 | Åström |
| 5,583,926 A | 12/1996 | Venier et al. |
| 5,586,177 A | 12/1996 | Farris et al. |
| 5,590,398 A | 12/1996 | Matthews |
| 5,594,942 A | 1/1997 | Antic et al. |
| 5,598,464 A | 1/1997 | Hess et al. |
| 5,602,909 A | 2/1997 | Carkner et al. |
| 5,610,977 A | 3/1997 | Williams et al. |
| 5,623,532 A | 4/1997 | Houde et al. |
| 5,625,681 A | 4/1997 | Butler, II |
| 5,671,225 A | 9/1997 | Hooper et al. |
| 5,689,548 A | 11/1997 | Maupin et al. |
| 5,689,555 A | 11/1997 | Sonnenberg |
| 5,696,816 A | 12/1997 | Sonnenberg |
| 5,706,286 A | 1/1998 | Reiman et al. |
| 5,711,002 A | 1/1998 | Foti |
| 5,711,284 A | 1/1998 | Keenan, Jr. |
| 5,740,239 A | 4/1998 | Bhagat et al. |
| 5,764,745 A | 6/1998 | Chan et al. |
| 5,768,358 A | 6/1998 | Venier et al. |
| 5,771,284 A | 6/1998 | Sonnenberg |
| 5,796,813 A | 8/1998 | Sonnenberg |
| 5,819,178 A | 10/1998 | Cropper |
| 5,822,694 A | 10/1998 | Coombes et al. |
| 5,832,382 A | 11/1998 | Alperovich |
| 5,838,683 A | 11/1998 | Corley et al. |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,949,871 A | 9/1999 | Kabay et al. |
| 5,953,662 A | 9/1999 | Lindquist et al. |
| 5,953,663 A | 9/1999 | Maupin et al. |
| 5,983,217 A | 11/1999 | Khosravi-Sichannie et al. |
| 6,006,098 A | 12/1999 | Rathnasabapathy et al. |
| 6,009,160 A | 12/1999 | Sonnenberg |
| 6,011,803 A | 1/2000 | Bicknell et al. |
| 6,014,557 A | 1/2000 | Morton et al. |
| 6,018,657 A | 1/2000 | Kennedy, III et al. |
| 6,021,126 A | 2/2000 | White et al. |
| 6,038,456 A | 3/2000 | Colby et al. |
| 6,049,714 A | 4/2000 | Patel |
| 6,097,960 A | 8/2000 | Rathnasabapathy et al. |
| 6,108,332 A | 8/2000 | Kasiviswanathan |
| 6,115,463 A | 9/2000 | Coulombe et al. |
| H1895 H | 10/2000 | Hoffpauir et al. |
| 6,128,377 A | 10/2000 | Sonnenberg |
| 6,134,316 A | 10/2000 | Kallioniemi et al. |
| 6,134,618 A | 10/2000 | Hebert |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,182,086 B1 | 1/2001 | Lomet et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,272,136 B1 | 8/2001 | Lin et al. |
| 6,308,075 B1 | 10/2001 | Irten et al. |
| 6,321,268 B1 | 11/2001 | Dillon et al. |
| 6,327,350 B1 | 12/2001 | Spangler et al. |
| 6,359,979 B1 | 3/2002 | Wang et al. |
| 6,411,632 B2 | 6/2002 | Lindgren et al. |
| 6,424,621 B1 | 7/2002 | Ramaswamy et al. |
| 6,424,832 B1 | 7/2002 | Britt et al. |
| 6,434,155 B1 | 8/2002 | Jones et al. |
| 6,438,223 B1 | 8/2002 | Eskafi et al. |
| 6,456,708 B1 | 9/2002 | Copley et al. |
| 6,463,055 B1 | 10/2002 | Lupien et al. |
| 6,466,796 B1 | 10/2002 | Jacobson et al. |
| 6,505,046 B1 | 1/2003 | Baker |
| 6,510,164 B1 | 1/2003 | Ramaswamy et al. |
| 6,515,997 B1 | 2/2003 | Feltner et al. |
| 6,535,599 B1 | 3/2003 | Torrey et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,570,855 B1 | 5/2003 | Kung et al. |
| 6,574,327 B2 | 6/2003 | Clark et al. |
| 6,574,481 B1 | 6/2003 | Rathnasabapathy et al. |
| 6,594,258 B1 | 7/2003 | Larson et al. |
| 6,606,668 B1 | 8/2003 | MeLampy et al. |
| 6,611,516 B1 | 8/2003 | Pirkola et al. |
| 6,639,981 B1 | 10/2003 | Dunn, Jr. et al. |
| 6,643,511 B1 | 11/2003 | Rune et al. |
| 6,647,113 B2 | 11/2003 | McCann et al. |
| 6,683,881 B1 | 1/2004 | Mijares et al. |
| 6,684,073 B1 | 1/2004 | Joss et al. |
| 6,724,801 B1 | 4/2004 | Sylvain |
| 6,731,741 B1 | 5/2004 | Fourcand et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,795,701 B1 | 9/2004 | Baker et al. |
| 6,836,477 B1 | 12/2004 | West, Jr. et al. |
| 6,839,421 B2 * | 1/2005 | Ferraro Esparza et al. ............ 379/220.01 |
| 6,865,266 B1 | 3/2005 | Pershan |
| 6,871,070 B2 | 3/2005 | Ejzak |
| 6,873,849 B2 * | 3/2005 | de la Red et al. ............ 455/445 |
| 6,885,872 B2 * | 4/2005 | McCann et al. ............ 455/466 |
| 6,914,973 B2 | 7/2005 | Marsico |
| 6,917,612 B2 | 7/2005 | Foti et al. |
| 6,944,666 B2 | 9/2005 | Belkin |
| 6,950,441 B1 | 9/2005 | Kaczmarczyk et al. |
| 7,010,002 B2 | 3/2006 | Chow et al. |
| 7,027,582 B2 * | 4/2006 | Khello et al. ............ 379/220.01 |
| 7,079,524 B2 | 7/2006 | Bantukul et al. |
| 7,079,853 B2 | 7/2006 | Rathnasabapathy et al. |
| 7,221,952 B2 | 5/2007 | Cho et al. |
| 7,457,283 B2 | 11/2008 | Dalton, Jr. et al. |
| 7,627,108 B1 | 12/2009 | Enzmann et al. |
| 7,664,495 B1 * | 2/2010 | Bonner et al. ............ 455/433 |
| 7,693,135 B2 | 4/2010 | Pershan |
| 7,746,864 B1 | 6/2010 | Asawa et al. |
| 7,787,878 B2 * | 8/2010 | Li et al. ............ 455/432.1 |
| 7,805,532 B2 * | 9/2010 | Pattison et al. ............ 709/230 |
| 7,860,231 B2 * | 12/2010 | Florkey et al. ............ 379/221.13 |
| 7,948,978 B1 * | 5/2011 | Rogers et al. ............ 370/389 |
| 7,984,130 B2 * | 7/2011 | Bogineni et al. ............ 709/223 |
| 8,027,319 B2 * | 9/2011 | Chin et al. ............ 370/338 |
| 2001/0030957 A1 | 10/2001 | McCann et al. |
| 2001/0040957 A1 | 11/2001 | McCann et al. |
| 2002/0048360 A1 | 4/2002 | Zambre et al. |
| 2002/0054674 A1 | 5/2002 | Chang et al. |
| 2002/0080947 A1 | 6/2002 | Mikhailov et al. |
| 2002/0114440 A1 | 8/2002 | Madour et al. |
| 2002/0122547 A1 | 9/2002 | Hinchey et al. |
| 2002/0173320 A1 | 11/2002 | Aitken et al. |
| 2002/0176562 A1 | 11/2002 | Hao |
| 2003/0026289 A1 | 2/2003 | Mukherjee et al. |
| 2003/0037108 A1 | 2/2003 | Peiffer et al. |
| 2003/0054844 A1 | 3/2003 | Anvekar et al. |
| 2003/0081754 A1 | 5/2003 | Esparza et al. |
| 2003/0095541 A1 | 5/2003 | Chang et al. |
| 2003/0109271 A1 | 6/2003 | Lewis et al. |
| 2003/0193967 A1 | 10/2003 | Fenton et al. |
| 2003/0227899 A1 | 12/2003 | McCann |
| 2004/0003114 A1 | 1/2004 | Adamczyk |
| 2004/0024894 A1 | 2/2004 | Osman et al. |
| 2004/0081206 A1 | 4/2004 | Allison et al. |
| 2004/0082332 A1 | 4/2004 | McCann et al. |
| 2004/0087300 A1 | 5/2004 | Lewis |

| | | | |
|---|---|---|---|
| 2004/0142707 | A1 | 7/2004 | Midkiff et al. |
| 2004/0184435 | A1 | 9/2004 | Westman |
| 2004/0198351 | A1 | 10/2004 | Knotts |
| 2004/0202187 | A1 | 10/2004 | Kelly et al. |
| 2004/0264671 | A1 | 12/2004 | Lamberton et al. |
| 2005/0003838 | A1 | 1/2005 | McCann et al. |
| 2005/0119017 | A1 | 6/2005 | Lovell, Jr. et al. |
| 2005/0281399 | A1 | 12/2005 | Moisey et al. |
| 2005/0286531 | A1 | 12/2005 | Tuohino et al. |
| 2006/0034270 | A1 | 2/2006 | Haase et al. |
| 2006/0079236 | A1 | 4/2006 | Del Pino et al. |
| 2006/0105766 | A1 | 5/2006 | Azada et al. |
| 2006/0245573 | A1 | 11/2006 | Sheth et al. |
| 2006/0291488 | A1 | 12/2006 | Naqvi et al. |
| 2007/0104184 | A1 | 5/2007 | Ku et al. |
| 2007/0153995 | A1* | 7/2007 | Fang et al. ............... 379/114.03 |
| 2007/0243876 | A1 | 10/2007 | Duan |
| 2007/0258575 | A1* | 11/2007 | Douglas et al. .......... 379/221.13 |
| 2007/0286379 | A1 | 12/2007 | Wiatrowski et al. |
| 2008/0013533 | A1* | 1/2008 | Bogineni et al. .............. 370/389 |
| 2008/0081754 | A1 | 4/2008 | Plemons et al. |
| 2008/0198862 | A1 | 8/2008 | Bantukul et al. |
| 2008/0198996 | A1* | 8/2008 | Bantukul et al. ......... 379/220.01 |
| 2009/0074174 | A1 | 3/2009 | Allen et al. |
| 2009/0227276 | A1 | 9/2009 | Agarwal et al. |

FOREIGN PATENT DOCUMENTS

| | | |
|---|---|---|
| EP | 0 669 771 A1 | 8/1995 |
| EP | 0 936 825 A3 | 8/1999 |
| EP | 0 944 276 A1 | 9/1999 |
| EP | 1 100 279 A2 | 5/2001 |
| EP | 1 282 983 B1 | 8/2010 |
| KR | 1020030025024 A | 3/2003 |
| KR | 10-2007-0061774 | 6/2007 |
| WO | WO 95/12292 A1 | 5/1995 |
| WO | WO 96/11557 | 4/1996 |
| WO | WO 97/33441 A1 | 9/1997 |
| WO | WO 97/42776 A2 | 11/1997 |
| WO | WO 98/56195 | 12/1998 |
| WO | WO 99/11087 A2 | 3/1999 |
| WO | WO 99/25130 A1 | 5/1999 |
| WO | WO 99/57926 | 11/1999 |
| WO | WO 00/16583 A1 | 3/2000 |
| WO | WO 00/60839 | 10/2000 |
| WO | WO 00/76134 A1 | 12/2000 |
| WO | WO 01/86971 A1 | 11/2001 |
| WO | WO 02/21857 A1 | 3/2002 |
| WO | WO 02/21859 | 3/2002 |
| WO | WO 03/005664 A2 | 1/2003 |
| WO | WO 2004/002043 A2 | 12/2003 |
| WO | WO 2004/006534 A1 | 1/2004 |
| WO | WO 2004/075507 A2 | 9/2004 |
| WO | WO 2007/146257 A2 | 12/2007 |
| WO | WO 2008/103333 A1 | 8/2008 |
| WO | WO 2008/103334 A1 | 8/2008 |
| WO | WO 2011/047382 A2 | 4/2011 |

OTHER PUBLICATIONS

Official Action for U.S. Appl. No. 11/731,772 (Aug. 24, 2011).
Notice of Abandonment for U.S. Appl. No. 11/731,800 (Aug. 3, 2011).
Communication regarding the expirey of the time limit within which notice of opposition may be filed for European application No. 01933084.4 (Jun. 16, 2011).
Notification of Transmittal of the International Search Report and the Written Opinion of the International Searching Authority, or the Declaration for International Application No. PCT/US2010/049157 (Jun. 3, 2011).
Interview Summary for U.S. Appl. No. 11/605,837 (May 24, 2011).
Official Action for U.S. Appl. No. 11/605,837 (Feb. 1, 2011).
Chinese Official Action for Chinese Patent Application No. 200780030069.7 (Jan. 31, 2011).
"Ericsson Unified Number Portability," (Downloaded from the Internet on Jan. 24, 2011).
Official Action for U.S. Appl. No. 11/731,800 (Jan. 18, 2011).
Official Action for U.S. Appl. No. 11/605,837 (Jul. 20, 2010).
Tsou et al., "Realm-Based Redirection In Diameter," draft-ietf-dime-realm-based-redirect-03, RFC 3588, pp. 1-6 (Jul. 12, 2010).
Final Official Action for U.S. Appl. No. 11/731,772 (Mar. 25, 2010).
Communication under Rule 71(3) EPC for European Application No. 01933084.4 (Feb. 23, 2010).
Korhonen et al., "Clarifications on the Routing of Diameter Requests Based on the Username and the Realm," RFC 5729, pp. 1-9 (Dec. 2009).
Notifications of Transmittal of the International Search Report and The Written Opinion of the International Searching Authority, or the Declarartion for International Application No. PCT/US2009/036538 (Sep. 30, 2009).
Communication pursuant to Article 94(3) EPC for European application No. 03761347.8 (Sep. 24, 2009).
Official Action for U.S. Appl. No. 11/731,772 (Jul. 14, 2009).
Communication of European publication number and information on the application of Article 67(3) EPC for European Application No. 07809476.0 (Feb. 11, 2009).
Communication pursuant to Article 94(3) EPC for European Application No. 01933084.4 (Jan. 12, 2009).
Notification of Transmittal of the International Search Report and the Written Opinion of the International Searching Authority, or the Declaration for International Application No. PCT/US2008/02150 (May 20, 2008).
Notification of Transmittal of the International Search Report and the Written Opinion of the International Searching Authority, or the Declaration for International Application No. PCT/US08/02147 (May 20, 2008).
"3rd Generation Partnership Project; Technical Specification Group Services and System Aspects; Policy and Charging Control Architecture (Release 8)," 3GPP TS 23.203, V8.1.1, pp. 1-87 (Mar. 2008).
Notification of Transmittal of the International Search Report and Writtent Opinion of the International Searching Authority,or the Declaration for International Application No. PCT/US07/13732 (Jan. 29, 2008).
"IP Multimedia Subsystem," printout from wikipedia.org, Wikimedia Foundation, Inc. (May 29, 2007).
Communication pursuant to Article 96(2) for European application No. 0373613478 (Apr. 10, 2007).
"HP OperCall Home Subscriber Server Software—Data Sheet", 4AA0-3360ENW Rev. 2, Hewlett-Packard Development Company, L.P. (Jul. 2006).
European Search Report for European application No. 037613478 (Mar. 9, 2006).
Notification of European publication number and information on the application of article 67(3) for European application No. 037613478 (Apr. 20, 2005).
Schwarz, "ENUM Trial to Link Phone, Internet Addresses," (Mar. 22, 2005).
Notice of Allowance and Fee(s) Due for U.S. Appl. No. 10/179,859 (Mar. 10, 2005).
Peterson, "Telephone Number Mapping (ENUM) Service Registration for Presence Services," Network Working Group, RFC 3953 (Jan. 2005).
3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).
Peterson et al., "Using E.164 Numbers with the Session Initiation Protocol (SIP)," Network Working Group, RFC 3824, pp. 1-14 (Jun. 2004).
Official Action for U.S. Appl. No. 10/179,859 (May 7, 2004).
"Cisco IP Transfer Point as the Signaling Gateway for the Cisco BTS 10200 Softswitch," Cisco Systems, Inc., pp. 1-10 (Summer 2004).
"Cisco IP Transfer Point as the Signaling Gateway for the Cisco PGW 2200 Softswitch," Cisco Systems, Inc., pp. 1-11 (Summer 2004).
"Next-Generation Signaling Transports Cisco IP Transfer Point," Cisco Systems, Inc., pp. 1-27 (Summer 2004).
"A Study in Mobile Messaging: The Evolution of Messaging in Mobile Networks, and How to Efficiently and Effectively Manage the Growing Messaging Traffic," White Paper, Cisco Systems, Inc., pp. 1-6 (Spring 2004).

Walker, "The IP Revolution in Mobile Messaging," Packet, Cisco Systems Users Magazine, vol. 16, No. 1, pp. Cover; 73-74; and 89 (First Quarter 2004).
"Cisco ITP Multilayer Routing (MLR) SMS MO Routing Requirements," Cisco Systems, Inc., p. 1 (Copyright 2004).
"Cisco Signaling Gateway Manager Release 3.2 For Cisco IP Transfer Point," Cisco Systems, Inc., pp. 1-9 (Copyright 1992-2004).
"Solutions for Mobile Network Operators," Cisco Systems, Inc., pp. 1-8 (Copyright 1992-2004).
Notification of the International Search Report or the Declaration for International Application No. PCT/US03/20256 (Dec. 11, 2003).
Supplemental Notice of Allowability for U.S. Appl. No. 09/503,541 (Aug. 5, 2003).
Supplemental Notice of Allowability for U.S. Appl. No. 09/823,061 (Jul. 28, 2003).
Supplemental Notice of Allowability for U.S. Appl. No. 09/503,541 (May 1, 2003).
Notice of Allowance and Fee(s) Due for U.S. Appl. No. 09/503,541 (Apr. 16, 2003).
Notice of Allowance and Fee(s) Due for U.S. Appl. No. 09/823,061 (Apr. 11, 2003).
Moodie, "Agilent acceSS7: White Paper," Agilent Technologies, pp. 1-14 (Apr. 1, 2003).
George et al., "SS7 MTP2-User Peer-to-Peer Adaptation Layer," Network Working Group Internet Draft, <draft-ietf-sigtran-m2pa-05.txt> (May 3, 2002).
Official Action for U.S. Appl. No. 09/503,541 (Mar. 11, 2003).
Foster et al., "Number Portability in the Global Switched Telephone Network (GSTN): An Overview," Network Working Group, RFC 3482 (Feb. 2003).
Interview Summary for U.S. Appl. No. 09/823,061 (Jan. 30, 2003).
"Cisco IP Transfer Point," Cisco Systems, Inc., pp. 1-10 (Copyright 1992-2003).
"Cisco IP Transfer Point Multilayer Short Message Service Routing Solution," Cisco Systems, Inc., pp. 1-6 (Copyright 1992-2003).
"Cisco ITP MAP Gateway for Public WLAN Slm Authentication and Authorization," Cisco Systems, Inc., pp. 1-13 (Copyright 1992-2003).
Official Action for U.S. Appl. No. 09/823,061 (Nov. 21, 2002).
Notification of Transmittal of International Preliminary Examination Report for International Application No. PCT/US01/14582 (Jul. 3, 2002).
Official Action for U.S. Appl. No. 09/823,061 (Jun. 18, 2002).
Barry, "A Signal for Savings," Packet, Cisco Systems Users Magazine, vol. 14, No. 4, pp. Cover; 19-21; and 81 (Fourth Quarter 2002).
"Global Implementation of ENUM: A Tutorial Paper," International Telecommunication Union, Telecommunication Standardization Union, Study Group 2, (Feb. 8, 2002).
"Agilent Technologies and Cisco Systems SS7 Over IP White Paper," Cisco Systems, Inc. and Agilent and Technologies, pp. 1-6 (Copyright 2002—Printed in the UK Feb. 1, 2002).
Sidebottom et al., "SS7 MTP3-User Adaptation Layer (M3UA)," Network Working Group Internet Draft, <draft-ietf-sigtran-m3ua-12.txt> (Feb. 2002).
"Cisco IP Transfer Point: MTP3 User Adaptation (M3UA) and SCCP User Adaptation (SUA) Signaling Gateway," Cisco Systems, Inc., pp. 1-14 (Copyright 2002).
"Cisco SS7 Port Adapter for the Cisco 7500 Versatile Interface Processor and 7200 VXR Routers Provide High-Density SS7 Aggregation," Cisco Systems, Inc., pp. 1-5 (Copyright 1992-2002).
"Next-Generation SS7 Networks with the Cisco IP Transfer Point," Cisco Systems, Inc., pp. 1-14 (Copright 1992-2002).
Morneault et al., "Signaling System 7 (SS7) Message Transfer Part 2 (MTP2)-User Adaptation Layer," pp. 1-83, (2002).
Sidebottom et al., "Signaling System 7 (SS7) Message Transfer Part 3 (MTP3)-User Adaptation layer (M3UA)," The Internet Society, pp. 1-106, (Feb. 2002).
"Agilent acceSS7 Business Intellligence," Agilent Technologies, pp. 1-6 (Copyright 2001—Printed in the UK Nov. 30, 2001).
The attached email dated Oct. 20, 2001 and PowerPoint presentation dated Oct. 24, 2001 disclose an MSISDN-based auto-provisioning solution proposed by a customer of the assignee of the presend application.

Notification of Transmittal of the International Search Report or the Declaration for International Application No. PCT/US01/14582 (Oct. 17, 2001).
Marshall et al., "SIP Extensions for Supporting Distributed Call State," SIP Working Group, Internet Draft, pp. 1-12 (Aug. 2001).
"Series H: Audiovisual and Multimedia Systems Infrastructure of Audiovisual Services—Communication Procedures; Control Protocol for Multimedia Communication," ITU-T H.245 (Jul. 2001).
Sprague, D., "Tekelec's Transport Adapter Layer Interface," The Internet Society, RFC 3094, pp. 1-93 (Apr. 2001).
"Cisco IP Transfer Point (ITP) Network Management Product Presentation," Cisco Systems, Inc., pp. 1-20 (Copyright 2001).
"Networkers," Cisco Systems, Inc., pp. 1-60 (Copyright 2001).
"Cisco SS7 Signaling Offload," Cisco Systems, Inc., pp. 1-33 (Copyright 1992-2001).
"Packet-Based Multimedia Communications Systems," International Telecommunication Union, H.323 (Nov. 2000).
"Call Signaling Protocols and Media Stream Packetization for Packet-Based Multimedia Communication Systems," International Telecommunication Union, H.225.0 (Nov. 2000).
"Control Protocol for Multimedia Communication," International Telecommunication Union, H.245, (Nov. 2000).
Cuervo et al., "Megaco Protocol Version 1.0," Network Working Group, RFC 3015 (Nov. 2000).
Stewart et al., "Steam Control Transmission Protocol," Network Working Group, RFC 2960 (Oct. 2000).
Mealling, "The Naming Authority Pointer (NAPTR) DNS Resource Record," Network Working Group, RFC 2915 (Sep. 2000).
Rockhold, "Or," Wireless Review, p. 22, 23, 26, 28, 30, 32, (Aug. 15, 2000).
Goldman, Chris, "Chasing WINP," Wireless Review, pp. 14-16, 18-21, (Aug. 15, 2000).
Stewart, et al., "Stream Control Transmission Protocol," The Internet Society, pp. 1-118, (2000).
"IP7 Secure Gateway Release 1.0," Tekelec, (Nov. 1999).
Arango et al., "Media Gateway Control Protocol (MGCP) Version 1.0," Network Working Group, RFC 2705 (Oct. 1999).
Vittore, "Enhanced Offerings Shoot for Easy," Telephony, p. 48, 50-51, (Mar. 8, 1999).
Liao et al., "SS7-TCAP/IP Interworking," Internet Engineering Task Force, pp. 1-14 (Mar. 1999).
Handley et al., "SIP: Session Initiation Protocol," Network Working Group, RFC 2543 (Mar. 1999).
Lin et al., "Number Portability for Telecommunication Networks," IEEE, pp. 56-62, (1999).
"Topsail Beach-SS7 Over IP-" Cisco Systems, Inc., pp. 1-16 (Copyright 1999).
McGrew, "Transport SS7 Signalling Over IP," Lucent Technologies Inc., 99. 1-8, (1998).
Levine, "Pancaking Portability," American's Network, p. 55-56, (Oct. 1, 1998).
Eagle, "Feature Guide Eagle STP," Tekelec, Inc., pp. i-vi, 1-208, (Jan. 1998).
"Feature Guide LNP LSMS," Tekelec, (Jan. 1998).
Moy, J., "OSPF Version 2," The Internet Society, pp. 1-191, (1998).
Chen, "Local Number Portability: Operations Impact and Architecture," BellSouth Telecommunications, pp. 973-981, (1998).
O'Shea, "The Network That's Never Done," Telephony, p. 38, 40, 42-43, (Sep. 15, 1997).
Rice, "Local Number Portability," Phone+Magazine, p. 1-2, (Jul. 19, 1997).
O'Shea, "The Great Seeping Software Takeover," Telephony, p. 32, 36, 38, 42, (Jun. 30, 1997).
Anonymous, "Alliances," Communications Week, p. 14-15, (Apr. 7, 1997).
Engebretson, "Much Ado About Numbers," Telephony, p. 22-24, 26, 28, (Apr. 7, 1997).
Bellcore, "NetPilot™—STP Interface for Administration of STP-Based Local Number Portability (LNP_Translations," Bellcore Communications Research, SR-4251, Issue 1, pp. 1-239, (Mar. 19, 1997).
Smith, "Number Portability Pileup," Telephony, pp. 22, 24, 26, (Jan. 6, 1997).

Jain et al., "Phone Number Portability for PCS Systems with ATM Backbones Using Distributed Dynamic Hashing," IEEE, vol. 15 (No. 1), p. 96-105, (Jan. 1997).

Snyder, "Testing Portability Possibilities," Telephony, p. 70, (Nov. 18, 1996).

Heinmiller, "Generic Requrements for SCP Application and GTT Function for Number Portability," Illinois Number Portability Workshop, p. 1-50, (Sep. 4, 1996).

International Telecommunication Union, "Series Q: Switching and Signalling: Specifications of Signalling Systems No. 7—Signalling Connection Control Part," p. 11-16, (Jul. 1996).

Rice, "SS7 Networks in a PCS World," Telephony, pp. 138, 140 142, 144, 146, (Jun. 24, 1996).

Tekelec, "Eagle STP Planning Guide", Eagle Network Switching Division, (No. 3), p. i-vii, 1-64, A1-A2, B1-2, (May 1996).

Anonymous, "Generic Switching and Signaling Requirements for Number Portability," AT&T Network Systems, Issue 1, pp. 1-75, (Feb. 2, 1996).

ETSI, Digital Cellular Telecommunications System (Phase 2+); Milbe Application Part (MAP) Specification, Global System for Mobile Communications, pp. 112-114 (1996).

Jain, et al., "A Hashing Scheme for Phone Number Portability in PCS Systems with ATM Backbones," Bell Communications Research, p. 593-597, (1996).

Bishop, "Freeing the Network for Competition," Telecommunications, p. 75-80, (Apr. 1995).

Anonymous, "Zeichengabesysteme-Eine neue Generation für ISDN und intelligente Netze," Zeichengabesystem, Medien-Institut Bremen, p. iz-xi; 170-176, (Feb. 17, 1995).

Giordano et al., "PCS Number Portability," IEEE, p. 1146-1150, (Sep. 1994).

Bellcore, "Signaling Transfer Point (STP) Generic Requirements," Bell Communications Research, No. 1, p. ii-xxii, 4-84-J14, (Jun. 1994).

Telcordia Technologies, "CCS Network Interface Specification (CCSNIS) Supporting SCCP and TCAP," Bell Communications Research, p. ii-xii, 1-1-C-22, (Mar. 1994).

Buckles, "Very High Capacity Signaling Trnsfer Point for Intelligent Network Services," DSC Communications Corporation, p. 1308-1311, (1988).

"Diameter Overview," referenced from www.ulticom.com/html/products/signalware-diameter-reference-guide.asp (Publication date unknown).

"Chapter 1: Overview," SS7 Port Adapter Installation and Configuration, pp. 1-1-1-8 (Publication Date Unknown).

"Configuring ITP Basic Functionally," IP Transfer Point, Cisco IOS Release 12.2(4)MB12, pp. 31-50 (Publication Date Unknown).

"Configuring ITP Optional Features," IP Transfer Point, Cisco IOS Release 12.294)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

Anonymous, "Isn't it Ironic . . . ," Supplement to America's Network, p. S5-S7.

Anonymous, "The ABC's of LNP," Supplement to America's Network, p. S3-S4.

"Mobile Wireless Overview," Cisco IOS Mobile Wireless Configuration Guide, pp. MWC-1-MWC-8 (Publication Date Unknown).

"A Global ENUM-based Service for Route Disclovery and Number Portability," GSMA PathFinder, 2 pgs. (Publication Date Unknown).

Extended European Search Report for European Application No. 08725747.3 (Dec. 23, 2011).

Final Official Action for U.S. Appl. No. 11/605,837 (Sep. 16, 2011).

\* cited by examiner

US 8,224,337 B2

METHODS, SYSTEMS, AND COMPUTER READABLE MEDIA FOR PROVIDING FOREIGN ROUTING ADDRESS INFORMATION TO A TELECOMMUNICATIONS NETWORK GATEWAY

PRIORITY CLAIM

This application claims the benefit of U.S. Provisional Patent Application Ser. No. 61/243,014, filed Sep. 16, 2009; the disclosure of which is incorporated herein by reference in its entirety.

TECHNICAL FIELD

The subject matter described herein relates to network gateways and obtaining routing address information associated with a foreign telecommunications network. More particularly, the subject matter described herein relates to methods, systems, and computer readable media for providing foreign routing address information to a telecommunications network gateway.

BACKGROUND

Number portability gives telephone service subscribers the ability to change service providers without changing their directory numbers. Accordingly, service provider networks, such as carrier telecommunications networks and hub provider networks, are configured to route calls to called party devices whose telephone number has be ported to another network. The ported from network may include a network element (e.g., a gateway element) that maintains number portability data, such as a local routing numbers (LRN), that is associated with a switch device that is servicing the ported called party number in the ported to network. The number portability information is forwarded to the ported to network in order for a call session involving the called party device to be established. In many cases, however, the established call session is still trunked through the original network to the ported to network. Similarly, subsequent signaling messages associated with the established call session may also be hairpinned via the original ported from network as well. As a consequence, call setup times are increased and network resources are being unnecessarily allocated in the original network to establish a call session with a former called party subscriber.

Accordingly, there exists a need for improved methods, systems, and computer readable media for providing foreign routing address information to a telecommunications network gateway.

SUMMARY

The subject matter described herein includes methods, systems, and computer readable media for providing foreign routing address information to a telecommunications network gateway. In one embodiment, the method includes, at a call signaling message routing node in a first telecommunications network, intercepting a call setup message that includes a called party number identifier and is directed towards a network gateway connected to at least one foreign telecommunications network. The method also includes accessing a foreign routing information database using an E.164 number mapping (ENUM) formatted query message to obtain foreign routing address information associated with the at least one foreign telecommunications network, modifying the call setup message to include the address information, and routing the modified call setup message towards the network gateway.

The subject matter described herein for providing foreign routing address information to a telecommunications network gateway may be implemented in hardware in combination with software and/or firmware. As such, the terms "function" or "module" as used herein refer to hardware in combination with software and/or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
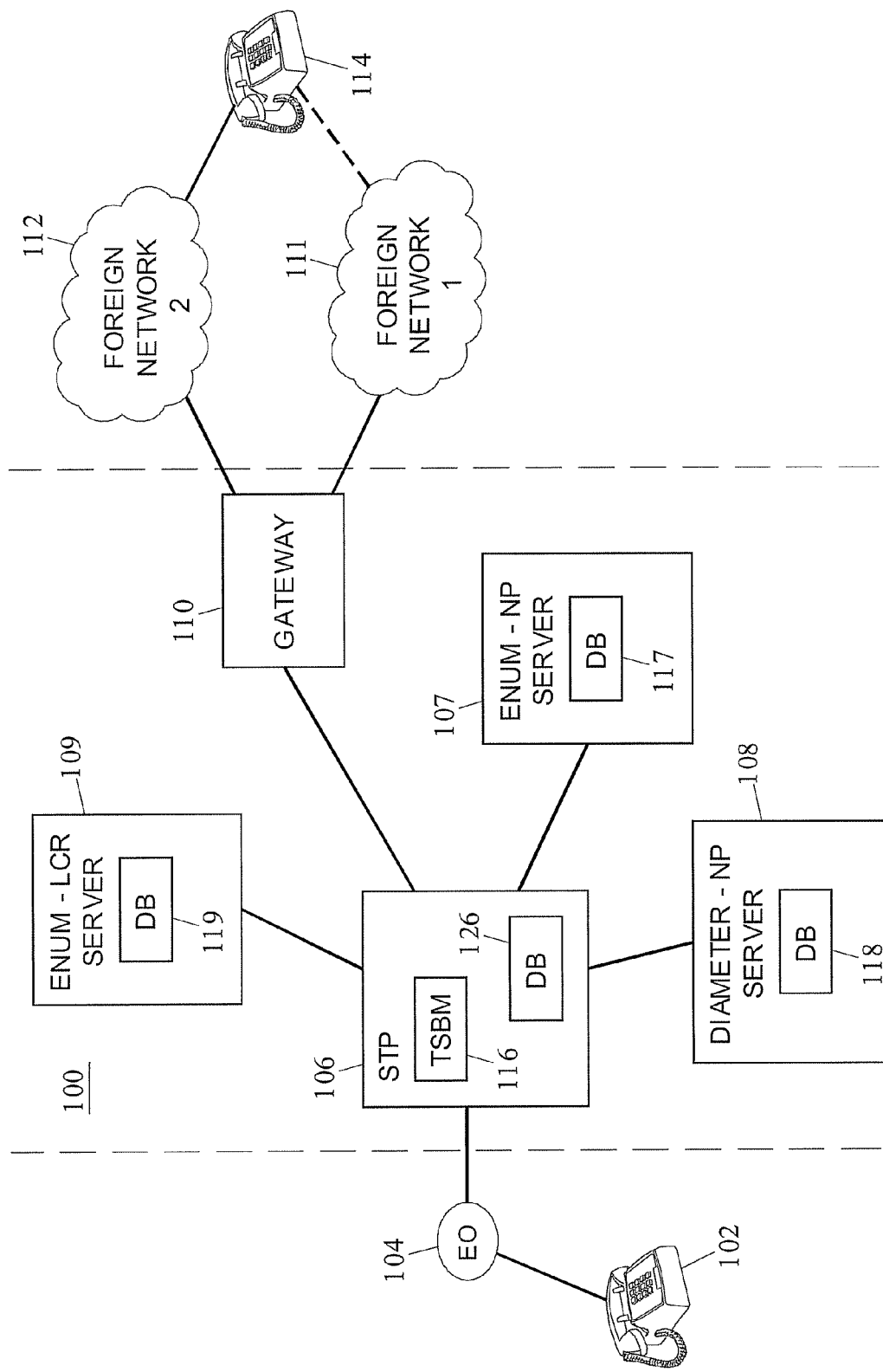
FIG. 1 is a network diagram illustrating an exemplary system for providing foreign routing address information to a network gateway according to an embodiment of the subject matter described herein.

FIG. 1 depicts an exemplary telecommunications network 100 that includes at least one call signaling message routing node (e.g., a signal transfer point (STP) or a DIAMETER signaling router (DSR) 106) (hereinafter, "STP 106") that is provisioned with a triggerless service broker module (TSBM) 116. In one embodiment, network 100 may include an entire carrier network or a hub provider network. Likewise, TSBM 116 may be a software application that is executed by a processor or CPU in STP 106 that enables STP 106 to intercept call signaling messages and request foreign routing address information associated with a called party number (CdPN) contained in an intercepted message from one or more servers (e.g., servers 107-109) in network 100. TSBM 116 may also be configured to modify the original call signaling message with the requested foreign routing address information and provide modified call signaling message to a network gateway 110 that is linked to one or more foreign telecommunications networks 111 and 112. In one embodiment, gateway 110 may includes an international gateway, which may comprise a tandem switching office, a soft switch, a media gateway controller (MGC), or a gateway mobile switching center (GMSC) configured to route calls to one or more international telecommunications networks. Namely, gateway 110 may be provided with foreign routing address information that can be used to efficiently route calls originating in network 100 and destined for foreign telecommunications networks (e.g., networks, carriers, and hub providers that are distinct from telecommunications network 100), such as a first foreign telecommunications network 111 and a second foreign telecommunications network 112. As used herein, a foreign telecommunications network includes any telecommunications network that is distinct and separate from network 100. For example, a foreign telecommunications network may include a telecommunications network based in a country that is different than the country in which network 100 is based. Also, a foreign telecommunications network may be based in the same country or state as network 100, but is instead managed and/or operated by a separate and distinct carrier provider or hub provider.

Figure 2:
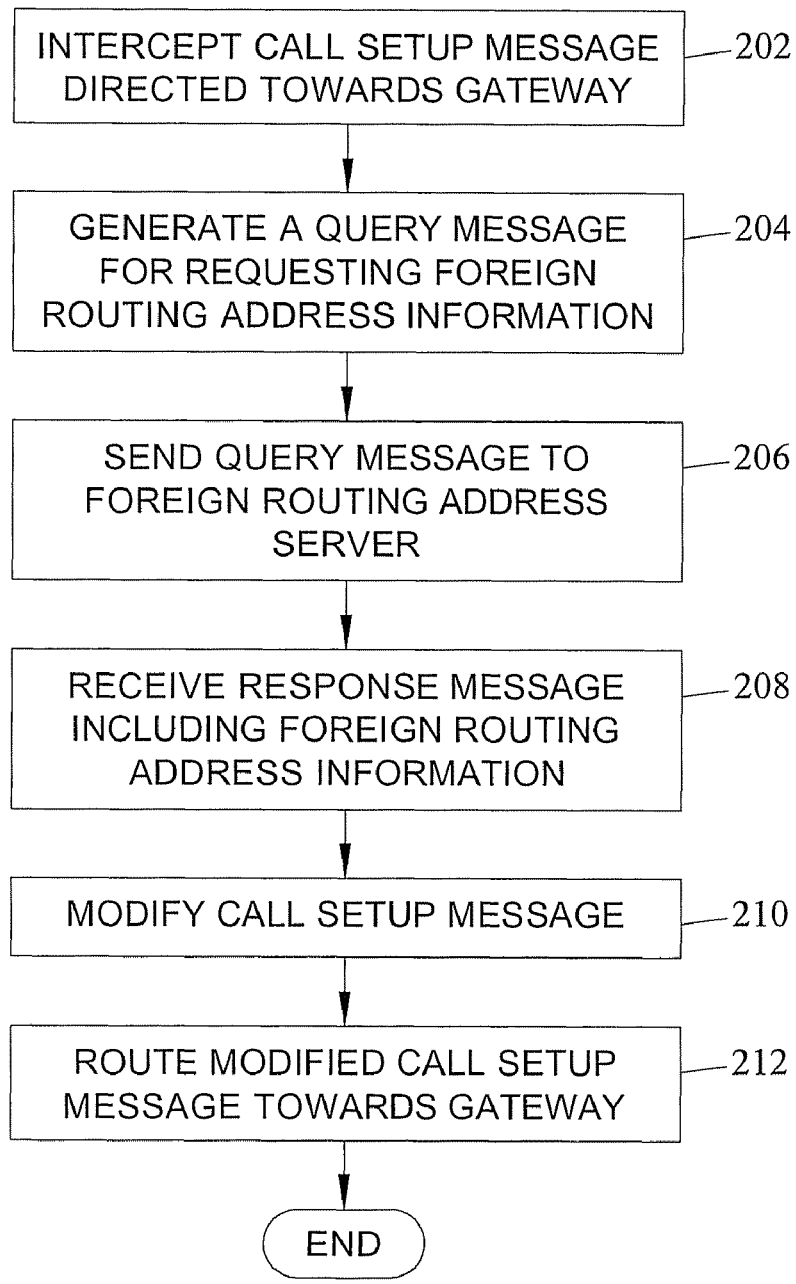
FIG. 2 is a flow chart illustrating an exemplary method providing foreign routing address information to a network gateway according to an embodiment of the subject matter described herein.

An exemplary method 200 in which TSBM 116 provides the foreign routing address information to gateway 110 is described by FIG. 2 in conjunction with the depicted system of FIG. 1. In block 202 of FIG. 2, a call setup message directed toward a network gateway is intercepted. In one embodiment, STP 106 intercepts an ISUP IAM call signaling message sent from end office 104 (e.g., a service switching point (SSP) or like network element) and directed towards gateway 110. For example, end office 104 first receives an off-hook signal from a calling device 102 that indicates (i.e., via dialed numbers) that calling device 102 is requesting a call session (e.g., an international call) with destination device 114. In one embodiment, calling device 102 and destination device 114 may each be a landline phone, a mobile phone, a SIP phone, or like device that can initiate or receive a call. Although FIG. 1 depicts calling device 102 and end office 104 as being separate from network 100, calling device 102 and end office 104 may be part of network 100 without departing from the scope of the present subject matter (e.g., network 100 may be a carrier network instead of a hub provider network).

Upon receiving the indication from calling device 102, end office 104 generates a call signaling message (e.g., an ISUP IAM) that includes the called party number associated with destination device 114. End office 104 may recognize that destination device 114 is located in a foreign network and may therefore send the call signaling message to gateway 110. While in transit towards gateway 110, the original call signaling message is intercepted by STP 106.

In block 204, a query message for requesting foreign routing address information is generated. In one embodiment, TSBM 116 in STP 106 extracts the called party number in the call signaling message and generates a query message to be sent to at least one server that contains foreign routing address information associated with the called party number in the original call signaling message. Depending on the embodiment, the query message may include a TCAP message, an E.164 number mapping standard (ENUM) message, a DIAMETER message, or the like.

In block 206, the query message is sent to the foreign routing address server requesting foreign address information associated with the called party number in the intercepted call signaling message. Foreign routing address information may include foreign number portability information, such as an LRN of a switch device in a foreign network. The foreign routing address information may also include least cost routing (LCR) information (e.g., routing number information, switch identifier information, switch address information, carrier identification information, service profile identifier (SPID) information, etc.) pertaining to a switch device in a foreign network. In one embodiment, LCR information may include addressing data that does not include switch-related information. For example, a gateway may be configured, after a certain time (e.g., time of day, day of week, etc.), to route all calls to a specific carrier network using a carrier identifier that is not specific to a particular switch or called party number.

In one embodiment, STP 106 is communicatively coupled to a plurality of servers located in network 100, such as an ENUM-based NP server 107, a DIAMETER-NP server 108, and an ENUM-based LCR server 109. In one embodiment, TSBM 116 sends an ENUM query message to ENUM-based NP server 107 to request an LRN of a switch in a foreign network (see FIG. 3). In another embodiment, TSBM 116 sends a DIAMETER query message to DIAMETER-based NP server 108 to request an LRN of a switch in a foreign network (see FIG. 4). In yet another embodiment, TSBM 116 sends an ENUM query message to an ENUM-based LCR server to request a routing number based of a switch in a foreign network in accordance with least cost routing parameters (see FIG. 5). In yet another embodiment, TSBM 116 sends a TCAP query message to an LNP server to request an LRN of a switch in a foreign network. In one embodiment, the query message may be sent to a local foreign routing address information database 126 located within STP 106. Specifically, the query message may be an internal signaling message and is not sent toward external servers 107-109. Thus, local database 126 may contain number portability data and least cost routing data that is associated with a switch device servicing called party number associated with a foreign network (e.g., foreign networks 111-112)

Returning to FIG. 2, a response message including foreign routing address information is received in block 208. In one embodiment, TSBM 116 receives an ENUM response message containing the LRN of the foreign switch that is serving destination device 114. In alternative embodiments, TSBM 116 is configured to receive ENUM and DIAMETER response messages containing the requested RN or LRN of foreign switches serving destination device 114. Notably, these response messages contain foreign routing address information that is obtained from at least one database in servers 107-109. For example, ENUM-based NP server 107 may include a local database 117 that contains number portability information that can be accessed using an ENUM query message. For example, the ENUM-based NP database 117 may be provisioned with number portability data (e.g., local routing numbers (LRNs)) that are respectively associated with a plurality of E.164 called party numbers. Thus, instead of providing a URI that corresponds to an E.164 telephone number when queried, database 117 may instead supply an LRN of a foreign switch device serving destination device 114. In an alternate embodiment, database 117 may contain both URI and number portability information that is associated with E.164 telephone numbers. In this scenario, the ENUM query message generated by TSBM 116 may need to include a flag to indicate which of the two types of information is being requested. In an alternate embodiment, ENUM-based NP server 107 may simply receive the ENUM query message from TSBM 116 and provide both a URI and LRN in an ENUM response message.

Similarly, DIAMETER-based NP server 108 may include a local database 118 that contains number portability information that can be accessed using a DIAMETER query message. In one embodiment, DIAMETER-based NP server 108 may provide the requested number portability data and/or DIAMETER data in the manner set forth above with respect to ENUM-based NP server 107. Likewise, ENUM-based LCR server 109 may include a local database 119 that contains least cost routing information that can be accessed using an ENUM query message. In one embodiment, DIAMETER-based NP server 108 may provide the requested LCR data and/or URI data in the manner not unlike ENUM-based NP server 107. Although FIG. 1 depicts databases 117-119 being local to servers 107-109, each of databases 117-119 may be located external to servers 107-109, respectively.

Returning to FIG. 2, the call setup message is modified in block 210. In one embodiment, TSBM 116 extracts the foreign routing address information from the response message and modifies the ISUP IAM to include the routing address information along with the called party number.

In block 212, the modified call setup message is routed towards the border gateway. In one embodiment, TSBM 116 sends the modified ISUP IAM message, which includes both the called party number and a RN, to gateway 110. Notably, the ISUP IAM is sent to the same gateway that the original ISUP IAM was initially directed towards, but is now modified with foreign routing address information to be used for more efficient routing in a foreign network.

As indicated in the description of method 200 above, there are several different types of query and response messages that can be used by TSBM 116. Similarly, there are several different types of routing address information servers and databases that may be accessed prior to routing an ISUP IAM to a foreign network via gateway 110. Accordingly, select exemplary embodiments of the present subject matter are depicted in call flow diagrams set forth in FIGS. 3-6.

Figure 3:
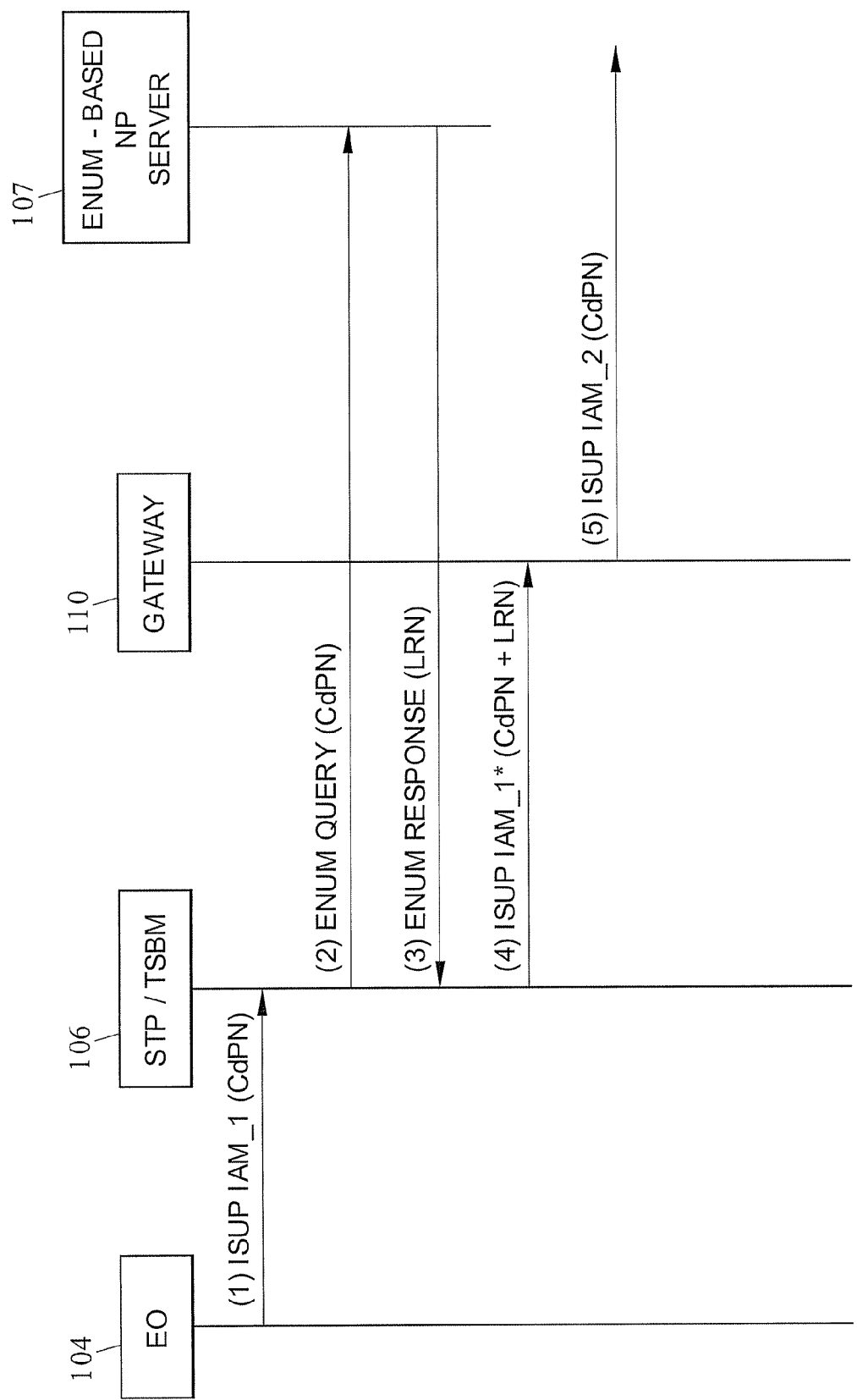
FIG. 3 is an exemplary call flow diagram for using an ENUM query to obtain number portability information according to an embodiment of the subject matter described herein.

For example, FIG. 3 depicts an exemplary call flow diagram of an ENUM based triggerless number portability service conducted by TSBM 116. In one embodiment of the present subject matter, end office 104 receives a call indication from calling device 102 to establish a call with destination device 114. As shown in FIG. 1, destination device 114 may be communicatively connected to and serviced by second foreign network 112. In one embodiment, destination device 114 was formerly subscribed to network 111 (as indicated by the dashed line in FIG. 1) but has since had its called party number ported from foreign network 111 to foreign network 112.

Upon receiving the indication from user device 102, end office (EO) 104 generates an ISDN user part (ISUP) initial address message (IAM) that includes the called party number (CdPN), or some other called party identifier. The ISUP IAM is launched from end office 104 toward network gateway 110 which is connected to the foreign network 111 (i.e., the ported from network that previously serviced destination device 114).

Instead of routing the ISUP IAM to gateway 110 with the called party number, STP 106 may be configured to modify the ISUP IAM so that gateway 110 can forward the ISUP IAM to the proper ported to network (e.g., network 112) while avoiding the ported from network (e.g., network 111). In order to obtain the number portability information needed by gateway 110, STP 106 may send a query message to access an appropriate number portability database. In one embodiment, TSBM 116 in STP 106 generates and sends an ENUM query message containing the CdPN to ENUM server 107. The ENUM query message may be used by TSBM 116 to request number portability information associated with the CdPN contained in the original ISUP IAM. In one embodiment, ENUM-based NP server 107 may include an international ENUM-based NP server configured to receive ENUM query messages and contain number portability information that is associated with one or more foreign gateways.

Upon receiving the ENUM NP query message, ENUM BASED ENUM-based NP server 107 uses the CdPN identifier to search ENUM-based NP database 117 in order to retrieve a local routing number (LRN) corresponding to a telephone switch (not shown) that is responsible for routing calls to the ported CdPN of destination device 114. After obtaining the LRN number from ENUM-based NP database 117, ENUM-based NP server 107 sends an ENUM response message containing the LRN to TSBM 116.

Upon receiving the ENUM response message, TSBM 116 modifies the ISUP IAM to include the acquired LRN information. In one embodiment, the digits that TSBM 116 inserts in the modified ISUP IAM may be steering or override type of data, and need not just be an LRN. TSBM 116 then routes the modified ISUP IAM to network gateway 110. After receiving the modified ISUP IAM, network gateway 110 extracts the LRN and uses the LRN information to route the call. Namely, gateway 110 uses the extracted information to determine that the modified ISUP IAM is to be routed to network 112. For example, the modified ISUP IAM may contain an LRN associated with a telephone switch located in network 112. Notably, the present subject matter enables the modified ISUP IAM to be directed to the destination device 114 in network 112 while completely avoiding the ported from network 111. Thus, network 111 is bypassed and does not need to allocate network resources to process the call intended for ported destination device 114.

In one embodiment, TSBM 116 is configured to perform a uniform resource identifier (URI)-to-valid routing number/ steering digit format translation. Namely, additional logic can be provided by the STP/TSBM to enhance the capability based on the return result of the ENUM dip. For example, TSBM 116 may formulate an ENUM query for requesting NP information associated with destination device 114. TSBM 116 may then receive a response message to the ENUM query that includes NP information (e.g., data other than an LRN) associated with destination device 114. TSBM 116 is configured to extract the NP information from the ENUM response message and to re-format the NP information (e.g., routing number, etc.) as necessary so that at least some of the NP information may be included in the modified ISUP IAM. For example, ENUM server 107 may include the routing number/ ported-to switch or gateway routing information in a URI format. TSBM 116 may be configured to extract the URI information from the ENUM response message and parse the URI information in order to obtain and/or derive a valid routing number or LRN. TSBM 116 then modifies the ISUP IAM to include the valid routing number or LRN. TSBM 116 subsequently routes the modified ISUP IAM to gateway 110 or tandem switching office.

Figure 4:
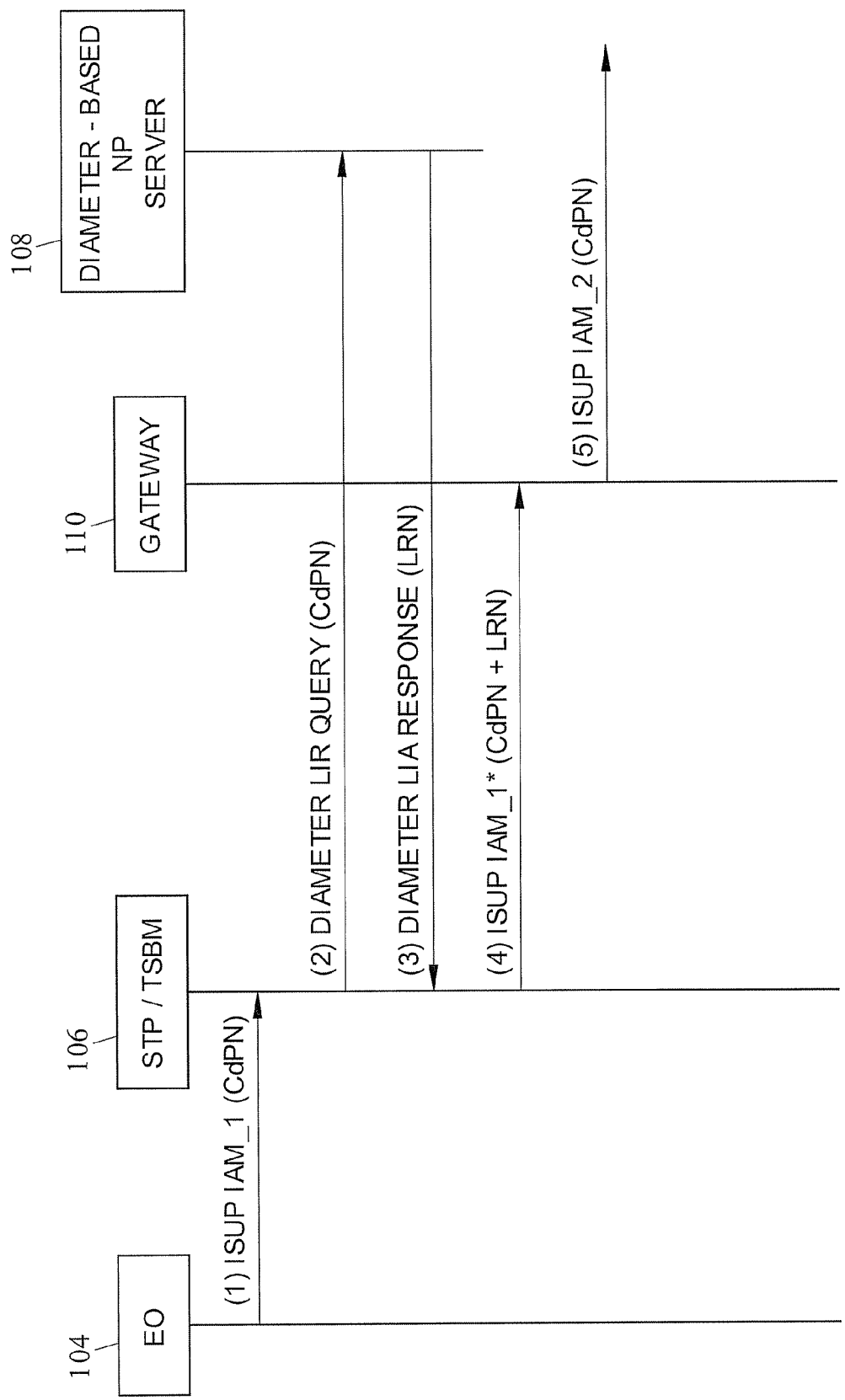
FIG. 4 is an exemplary call flow diagram for using a DIAMETER query to obtain number portability information according to an embodiment of the subject matter described herein.

FIG. 4 depicts an exemplary call flow diagram of a DIAMETER based triggerless number portability service conducted by TSBM 116. In one embodiment of the present subject matter, end office 104 receives a call indication from calling device 102 to establish a call with destination device 114. Upon receiving the indication from calling device 102, end office 104 generates an ISUP IAM that includes the called party number, or some other called party identifier. The ISUP IAM is launched from end office 104 toward network gateway 110 which is connected to the foreign network 111 (i.e., the ported from network that previously serviced destination device 114).

Instead of routing the ISUP IAM to gateway 110 with the called party number, STP 106 may be configured to modify the ISUP IAM so that gateway 110 can forward the ISUP IAM to the proper ported to network (e.g., network 112) while avoiding the ported from network (e.g., network 111). In order to obtain the number portability information needed by gateway 110, STP 106 may send a query message to access an appropriate number portability database. In one embodiment, TSBM 116 in STP 106 generates and sends a DIAMETER-based query message containing the CdPN to DIAMETER-based NP server 108. Although FIG. 4 depicts using a DIAMETER Location-Information-Request (LIR) query message, any other DIAMETER query message may be used to request number portability information.

The DIAMETER LIR query message may be used by TSBM 116 to request number portability information associated with the CdPN contained in the original ISUP IAM. In one embodiment, DIAMETER-based NP server 108 may include an international DIAMETER-based NP server is configured to receive DIAMETER query messages and contains number portability information that is associated with one or more foreign gateways.

Upon receiving the DIAMETER LIR query message, DIAMETER-based NP server 108 uses the CdPN identifier to search DIAMETER-NP database 118 in order to retrieve a LRN corresponding to a telephone switch (not shown) that is responsible for routing calls to the ported CdPN of destination device 114. After obtaining the LRN number from DIAMETER-based NP database 118, DIAMETER-based NP server 108 sends a DIAMETER-based response message containing the LRN to TSBM 116. Although FIG. 4 depicts using a DIAMETER Location-Information-Answer (LIA) response message, any other DIAMETER response message may be used to provide number portability information to STP 106.

Upon receiving the DIAMETER LIA response message, TSBM 116 modifies the ISUP IAM to include the acquired LRN information. TSBM 116 then routes the modified ISUP IAM to network gateway 110. After receiving the modified ISUP IAM, network gateway 110 extracts the LRN and uses the LRN information to route the call. Namely, gateway 110 uses the extracted information to determine that the modified ISUP IAM is to be routed to network 112. For example, the modified ISUP IAM may contain an LRN associated with a telephone switch located in network 112.

In one embodiment, TSBM 116 is configured to perform a uniform resource identifier (URI)-to-valid routing number/steering digit format translation as explained above. In one embodiment, additional logic can be provided by the STP/TSBM to enhance the capability based on the return result of the DIAMETER server/database dip. For example, TSBM 116 may formulate a DIAMETER query message to request NP information (e.g., URI information) associated with destination device 114. Upon receiving the DIAMETER response message, TSBM 116 may be configured to extract the URI information and parse the URI information to obtain and/or derive a valid routing number or LRN. TSBM 116 then modifies the ISUP IAM to include the valid routing number or LRN. TSBM 116 subsequently routes the modified ISUP IAM to gateway 110.

Figure 5:
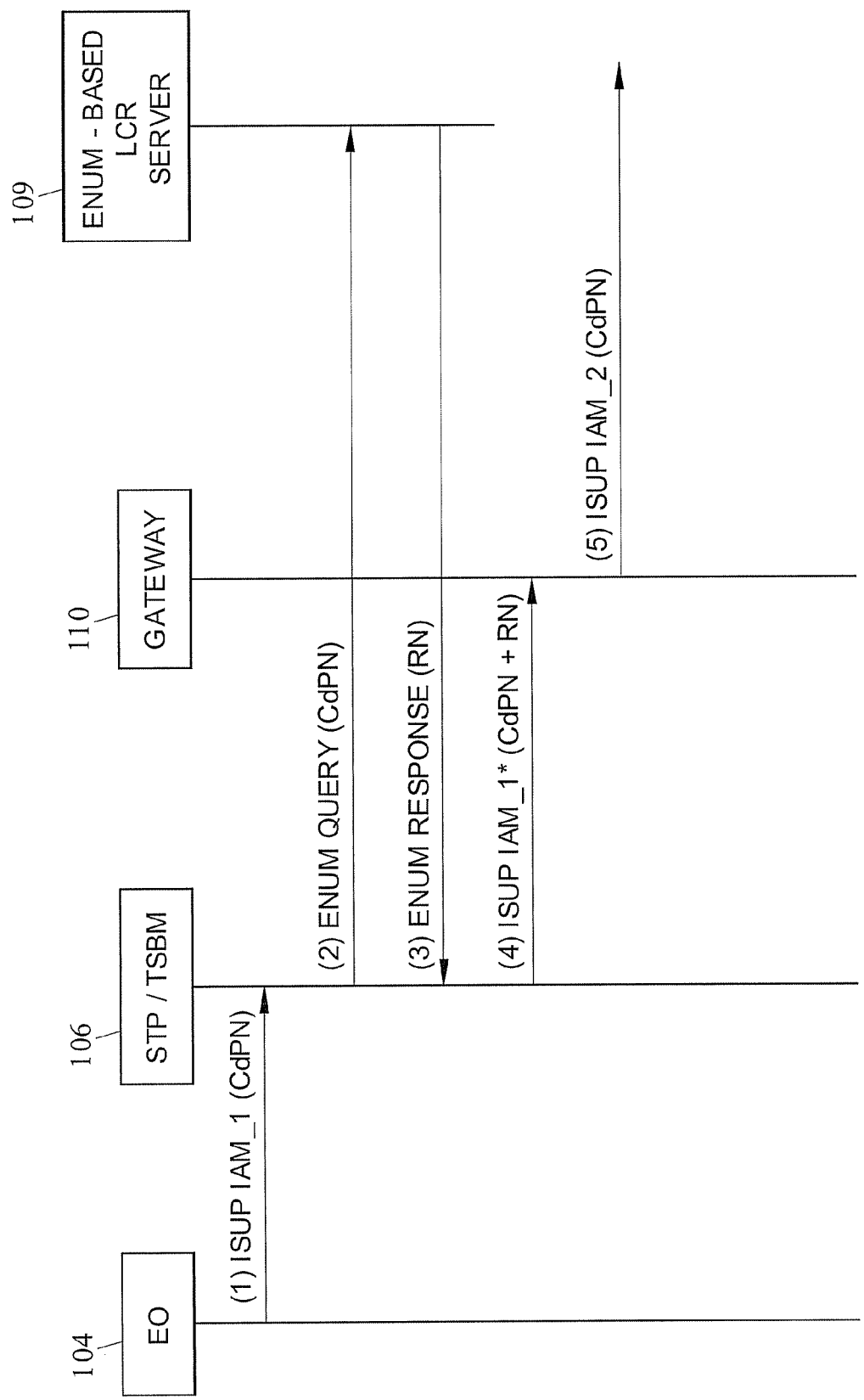
FIG. 5 is an exemplary call flow diagram for using an ENUM query to obtain least cost routing information according to an embodiment of the subject matter described herein.

FIG. 5 depicts an exemplary call flow diagram of an ENUM based triggerless least cost routing (LCR) service conducted by TSBM 116. In one embodiment of the present subject matter, end office 104 receives a call indication from calling device 102 to establish a call with destination device 114. Upon receiving the indication from calling device 102, end office 104 generates an ISUP IAM that includes the called party number, or some other called party identifier. The ISUP IAM is launched from end office 104 toward network gateway 110 which is connected to the foreign network 111 (i.e., a network that includes an inefficient or costly route to destination device 114).

Instead of routing the ISUP IAM to gateway 110 with the called party number, STP 106 may be configured to modify the ISUP IAM so that gateway 110 can forward the ISUP IAM to the efficient network (e.g., network 112) while avoiding the inefficient network (e.g., network 111). In order to obtain the LCR information needed by gateway 110, STP 106 may send a query message to access an appropriate LCR database. In one embodiment, TSBM 116 in STP 106 generates and sends an ENUM-based query message containing the CdPN to ENUM server 108.

The ENUM query message may be used by TSBM 116 to request LCR information associated with the CdPN contained in the original ISUP IAM. In one embodiment, ENUM-based NP server 108 may include an ENUM-BASED LCR server is configured to receive ENUM query messages and contains LCR information that is associated with one or more foreign gateways.

Upon receiving the ENUM query message, ENUM-based NP server 108 uses the CdPN identifier to search ENUM-based LCR database 118 in order to retrieve a RN corresponding to a telephone switch (not shown) that is responsible for routing calls to the CdPN of destination device 114. After obtaining the RN from ENUM-based LCR database 118, ENUM-based LCR server 108 sends an ENUM-based response message containing an RN associated with the called party number to TSBM 116.

Upon receiving the ENUM response message, TSBM 116 modifies the ISUP IAM to include the acquired routing number information. TSBM 116 then routes the modified ISUP IAM to network gateway 110. After receiving the modified ISUP IAM, network gateway 110 extracts the RN information and uses the RN information to route the call. Namely, gateway 110 determines that the modified ISUP IAM is to be routed to network 112. For example, the modified ISUP IAM may contain an RN associated with a telephone switch located in network 112.

In one embodiment, TSBM 116 is configured to perform a uniform resource identifier (URI)-to-valid routing number/steering digit format translation. Namely, additional logic can be provided by the STP/TSBM to enhance the capability based on the return result of the ENUM dip. For example, TSBM 116 may formulate an ENUM query for requesting LCR information associated with destination device 114. TSBM 116 may then receive a response message to the ENUM query that includes LCR information (e.g., data indicating an optimal route or link) associated with destination device 114. TSBM 116 is configured to extract the LCR information from the ENUM response message and to reformat the LCR information (e.g., routing number, etc.) as necessary so that at least some of the LCR information may be included in the modified ISUP IAM. For example, ENUM server 107 may include a routing number or gateway routing information in a URI format. TSBM 116 may be configured to extract the URI information from the ENUM response message and parse the URI information in order to obtain and/or derive a valid routing number. TSBM 116 then modifies the ISUP IAM to include the valid routing number. TSBM 116 subsequently routes the modified ISUP IAM to gateway 110 or tandem switching office.

Figure 6:
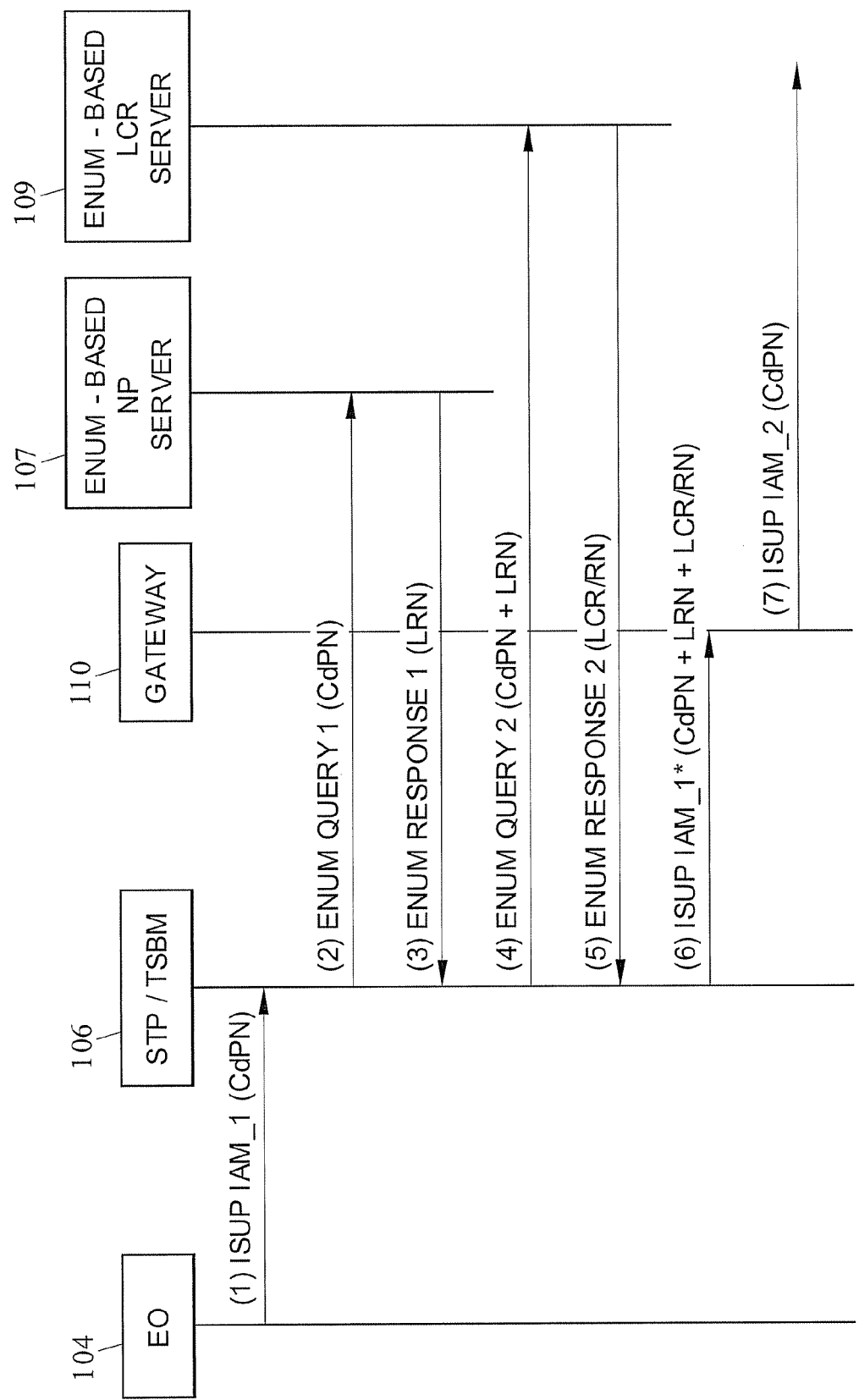
FIG. 6 is an exemplary call flow diagram for using ENUM queries to obtain both number portability information and least cost routing information according to an embodiment of the subject matter described herein.

FIG. 6 depicts an exemplary call flow diagram of an ENUM based triggerless number portability service combined with LCR service conducted by TSBM 116. In one embodiment, end office 104 receives a call indication from calling device 102 to establish a call with destination device 114. Upon receiving the indication from user device 102, end office (EO) 104 generates an ISDN user part (ISUP) initial address message (IAM) that includes the called party number (CdPN), or some other called party identifier. The ISUP IAM is launched from end office 104 toward network gateway 110, which is connected to the foreign network 111 (i.e., the ported from network that previously serviced destination device 114), and intercepted by STP 106. Instead of routing the ISUP IAM to gateway 110 with the called party number, STP 106 may be configured to modify the ISUP IAM to include both number portability information and LCR information. For example, TSBM 116 may generate and send a first ENUM query message containing the CdPN to ENUM server 107 and a second ENUM query message containing the CdPN to ENUM-based LCR server 109. In the manner explained above with regard to FIGS. 3 and 5, TSBM 106 may receive an a first ENUM response message containing an LRN from ENUM-based NP server 107 and a second ENUM response message containing a RN from ENUM-based LCR server 109.

Upon receiving the ENUM response messages, TSBM 116 modifies the ISUP IAM to include both the acquired LRN information and LCR information (e.g., a RN). In one embodiment, the digits that TSBM 116 inserts in the modified ISUP IAM may be steering or override type of data, and need not just be an LRN. TSBM 116 then routes the modified ISUP IAM to network gateway 110. After receiving the modified ISUP IAM, network gateway 110 extracts the LRN and RN and uses the extracted information to route the call.

In one embodiment, TSBM 116 is configured to perform a uniform resource identifier (URI)-to-valid routing number/steering digit format translation. Namely, additional logic can be provided by the STP/TSBM to enhance the capability based on the return result of the ENUM dips.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing switch address information to a foreign telecommunications network, the method comprising:
    at a call signaling message routing node in a first telecommunications network, wherein the call signaling message routing node includes a DIAMETER signaling router (DSR):
    intercepting a call setup message that includes a called party number identifier and is directed towards a first foreign telecommunications network via a network gateway connected to the first foreign telecommunications network and a second foreign telecommunications network;
    accessing a foreign routing information database using an ENUM formatted query message to obtain foreign routing address information associated with the second foreign telecommunications network;
    modifying the call setup message to include the address information associated with the second foreign telecommunications network; and
    routing the modified call setup message towards the network gateway.

2. The method of claim 1 wherein the foreign routing address information is associated with the called party number and a switch device in the second foreign telecommunications network.

3. The method of claim 2 wherein accessing the foreign routing information database includes generating the ENUM formatted query message to request address information associated with the called party number and a switch device in the second foreign telecommunications network, transmitting the ENUM formatted query message to a server in the first telecommunications network that contains the address information and receiving, from the server, an ENUM formatted response message that includes the address information.

4. The method of claim 1 wherein the foreign routing information database is located within the call signaling message routing node.

5. The method of claim 1 wherein the foreign routing address information includes at least one of number portability information and least cost routing information.

6. The method of claim 1 wherein the gateway includes an international gateway providing a connection to the first foreign telecommunications network and the second foreign telecommunications network.

7. The method of claim 2 wherein the foreign routing address information includes at least one of a routing number and a local routing number (LRN) associated with a switch device in the second foreign telecommunications network.

8. The method of claim 1 wherein the foreign routing address information includes a uniform resource identifier (URI) that is translated to generate at least one of a routing number and a local routing number.

9. The method of claim 1 wherein the call setup message includes an ISDN user part (ISUP) initial address message (IAM).

10. The method of claim 1 wherein the foreign routing address information includes at least one of switch identifier information, switch address information, carrier identification information, service profile identifier (SPID) information associated with the second foreign telecommunications network.

11. A method for providing switch address information to a foreign telecommunications network, the method comprising:
    at a call signaling message routing node in a first telecommunications network:
    intercepting a call setup message that includes a called party number identifier and is directed towards a first foreign telecommunications network via a network gateway connected to the first foreign telecommunications network and a second foreign telecommunications network;
    accessing a foreign routing information database using a DIAMETER formatted query message to obtain foreign routing address information associated with the second foreign telecommunications network;
    modifying the call setup message to include the address information associated with the second foreign telecommunications network; and
    routing the modified call setup message towards the network gateway.

12. The method of claim 11 wherein the foreign routing address information is associated with the called party number and a switch device in the second foreign telecommunications network.

13. The method of claim 12 wherein accessing the foreign routing information database includes generating the DIAMETER formatted query message to request address information associated with the called party number and a switch device in the second foreign telecommunications network, transmitting the DIAMETER formatted query message to a server in the first telecommunications network that contains the address information, and receiving, from the server, a DIAMETER formatted response message that includes the address information.

14. The method of claim 11 wherein the foreign routing information database is located within the call signaling message routing node.

15. The method of claim 11 wherein the foreign routing address information includes at least one of number portability information and least cost routing information.

16. The method of claim 11 wherein the DIAMETER formatted query message includes a DIAMETER location information request (LIR) query message.

17. The method of claim 13 wherein the DIAMETER response message includes a DIAMETER location information answer (LIA) response message.

18. The method of claim 11 wherein the gateway includes an international gateway providing a connection to the first foreign telecommunications network and the second foreign telecommunications network.

19. The method of claim 12 wherein the foreign routing address information includes at least one of a routing number and a local routing number (LRN) associated with a switch device in the second foreign telecommunications network.

20. The method of claim 11 wherein the foreign routing address information includes a uniform resource identifier (URI) that is translated to generate at least one of a routing number and a local routing number.

21. The method of claim 11 wherein the call setup message includes an ISDN user part (ISUP) initial address message (IAM).

22. The method of claim 11 wherein the call signaling message routing node includes a signal transfer point (STP) or a DIAMETER signaling router (DSR).

23. The method of claim 11 wherein the foreign routing address information includes at least one of switch identifier information, switch address information, carrier identification information, service profile identifier (SPID) information associated with the second foreign telecommunications network.

24. A system for providing switch address information to a foreign telecommunications network, the system comprising:
in a first telecommunications network:
a network gateway that is connected to a first foreign telecommunications network and a second telecommunications network and configured for receiving a modified call signaling message and routing the modified call signaling message; and
a call signaling message routing node configured for intercepting a call setup message that includes a called party number identifier and is directed towards the first foreign telecommunications network via the network gateway, for accessing a foreign routing information database using a DIAMETER formatted query message to obtain foreign routing address information associated with the second foreign telecommunications network, and for modifying the call setup message to include the address information associated with the second foreign telecommunications network.

25. The system of claim 24 wherein the foreign routing address information is associated with the called party number and a switch device in the second foreign telecommunications network.

26. The system of claim 25 wherein the call signaling message routing node is configured for generating a DIAMETER formatted query message to request address information associated with the called party number and a switch device in the second foreign telecommunications network, transmitting the DIAMETER formatted query message to a server in the first telecommunications network that contains the address information, and receiving, from the server, a DIAMETER formatted response message that includes the address information.

27. The system of claim 24 wherein the foreign routing information database is located within the call signaling message routing node.

28. The system of claim 24 wherein the foreign routing address information includes at least one of number portability information and least cost routing information.

29. The system of claim 24 wherein the gateway includes an international gateway providing a connection to the first foreign telecommunications network and the second foreign telecommunications network.

30. The system of claim 25 wherein the foreign routing address information includes at least one of a routing number and a local routing number (LRN) associated with a switch device in the second foreign telecommunications network.

31. The system of claim 24 wherein the foreign routing address information includes a uniform resource identifier (URI) that is translated to generate at least one of a routing number and a local routing number.

32. The system of claim 24 wherein the call setup message includes an ISDN user part (ISUP) initial address message (IAM).

33. The system of claim 24 wherein the call signaling message routing node includes a signal transfer point (STP) or a DIAMETER signaling router (DSR).

34. The system of claim 24 wherein the foreign routing address information includes at least one of switch identifier information, switch address information, carrier identification information, service profile identifier (SPID) information associated with the second foreign telecommunications network.

35. A non-transitory computer readable medium having stored thereon executable instructions that when executed by the processor of a computer control the computer to perform steps comprising:
at a call signaling message routing node in a first telecommunications network:
intercepting a call setup message that includes a called party number identifier and is directed towards a first foreign telecommunications network via a network gateway connected to the first foreign telecommunications network and a second foreign telecommunications network;
accessing a foreign routing information database using a DIAMETER formatted query message to obtain foreign routing address information associated with the second foreign telecommunications network;
modifying the call setup message to include the address information associated with the second foreign telecommunications network; and
routing the modified call setup message towards the network gateway.

* * * * *